(12) United States Patent
Willis et al.

(10) Patent No.: US 7,509,655 B2
(45) Date of Patent: Mar. 24, 2009

(54) INTEGRATION OF WORKFLOW AND RULES

(75) Inventors: Jurgen A. Willis, Woodinville, WA (US); Donald J. McCrady, Redmond, WA (US); John A. Rummell, Bothell, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 11/512,861

(22) Filed: Aug. 30, 2006

(65) Prior Publication Data

US 2008/0126161 A1   May 29, 2008

(51) Int. Cl.
| G06F 3/00 | (2006.01) |
| G06F 9/44 | (2006.01) |
| G06F 9/46 | (2006.01) |
| G06F 13/00 | (2006.01) |
| G06F 17/00 | (2006.01) |
| G06Q 10/00 | (2006.01) |
| G06Q 30/00 | (2006.01) |
| G06N 5/02 | (2006.01) |

(52) U.S. Cl. .................. 719/320; 705/1; 706/47
(58) Field of Classification Search .......... 719/313, 719/320; 705/1, 4, 8; 706/47
See application file for complete search history.

(56) References Cited

U.S. PATENT DOCUMENTS

| 6,741,975 | B1 | 5/2004 | Nakisa et al. |
| 6,856,980 | B2 | 2/2005 | Feldman et al. |
| 7,020,618 | B1 | 3/2006 | Ward |
| 7,170,993 | B2* | 1/2007 | Anderson et al. ...... 379/265.09 |
| 2003/0195762 | A1 | 10/2003 | Gleason et al. |
| 2004/0054743 | A1* | 3/2004 | McPartlan et al. .......... 709/206 |
| 2004/0122699 | A1 | 6/2004 | Brito et al. |
| 2005/0038764 | A1 | 2/2005 | Minsky et al. |
| 2005/0091080 | A1 | 4/2005 | Biats, Jr. |
| 2005/0093881 | A1* | 5/2005 | Okita et al. .................. 345/589 |
| 2006/0041450 | A1 | 2/2006 | Dugan |
| 2006/0067252 | A1* | 3/2006 | John et al. .................... 370/261 |
| 2006/0075396 | A1 | 4/2006 | Surasinghe |

FOREIGN PATENT DOCUMENTS

WO   WO2005117549 A2   12/2005

OTHER PUBLICATIONS

"JAsCo for Linking Business Rules to Object-Oriented Software", http://ssel.vub.ac.be/Members/wvdperre/papers/CSITeA%202003.pdf.
Rouvellou, et al., "Combining different business rules technologies: A rationalization", http://ebusiness.mit.edu/bgrosof/paps/oopsla00-br-wksh.pdf.
Yu, et al., "A Taxonomy of Workflow Management Systems for Grid Computing", http://www.gridbus.org/reports/GridWorkflowTaxonomy.pdf.

\* cited by examiner

*Primary Examiner*—Meng-Ai An
*Assistant Examiner*—Qing-Yuan Wu

(57) ABSTRACT

Various technologies for integrating workflow services are described. In accordance with one described embodiment, an integrated workflow services system includes a host process, such as a Windows® application program. The host process hosts a workflow foundation runtime engine for executing workflows and a workflow foundation library. A workflow executable by the workflow foundation runtime engine may include an activity (e.g., a policy activity) that defines a ruleset that includes a number of rules (e.g., business rules). At least one rule of the ruleset is defined directly against the workflow. Furthermore, the activity has access to a rules engine capable of evaluating rules in the ruleset.

17 Claims, 7 Drawing Sheets

INTEGRATION OF WORKFLOW AND RULES

BACKGROUND

Automated workflow technologies are designed to improve productivity in the workplace. By automating various types of business processes, workflow technologies allow business transactions to be conducted more efficiently.

In one example, a business process includes a number of decisions or actions related to the processing of a document (e.g., an electronic document). Specifically, in one instance, the business process relates to the evaluation process of a submitted electronic insurance application. The electronic application is submitted by an applicant and a series of actions and decisions are taken on the electronic application to determine whether to approve or reject the applicant.

To model this business process, a workflow can include a number of activities that corresponds to different steps of the business process. At each of the activities, an action (e.g., determining whether an applicant meets a specific criteria) can be taken. Clearly then, an important part of an automated workflow technology is on how decisions are made in the workflow. And usually, a rules engine is responsible for evaluating rules utilized in a workflow.

However, under conventional approaches, workflow software products and rules engines have been delivered as separated technologies with limited integration. As a result, this lack of integration delivers a disconnected experience to users. In particular, a user is unable to directly model rules against different aspects of a workflow.

SUMMARY

This Summary is provided to introduce a selection of concepts in a simplified form that are further described below in the Detailed Description. This summary is not intended to identify key features or essential features 6f the claimed subject matter, nor is it intended to be used as an aid in determining the scope of the claimed subject matter.

Various technologies for integrating workflow services are described. In accordance with one described embodiment, an integrated workflow services system includes a host process, such as a Windows® application program. The host process hosts a workflow foundation runtime engine for executing workflows and a workflow foundation library. A workflow executable by the workflow foundation runtime engine may include an activity (e.g., a policy activity or a custom activity) that defines a ruleset that includes a number of rules (e.g., business rules). At least one rule of the ruleset is defined directly against the workflow. Furthermore, the activity has access to a rules engine capable of evaluating rules in the ruleset.

Embodiments demonstrate a high level of integration between a workflow services system and a rules engine, which allows rules to be directly modeled against different aspects (e.g., fields and/or activities) of a workflow.

DETAILED DESCRIPTION OF THE DRAWINGS

Figure 1:
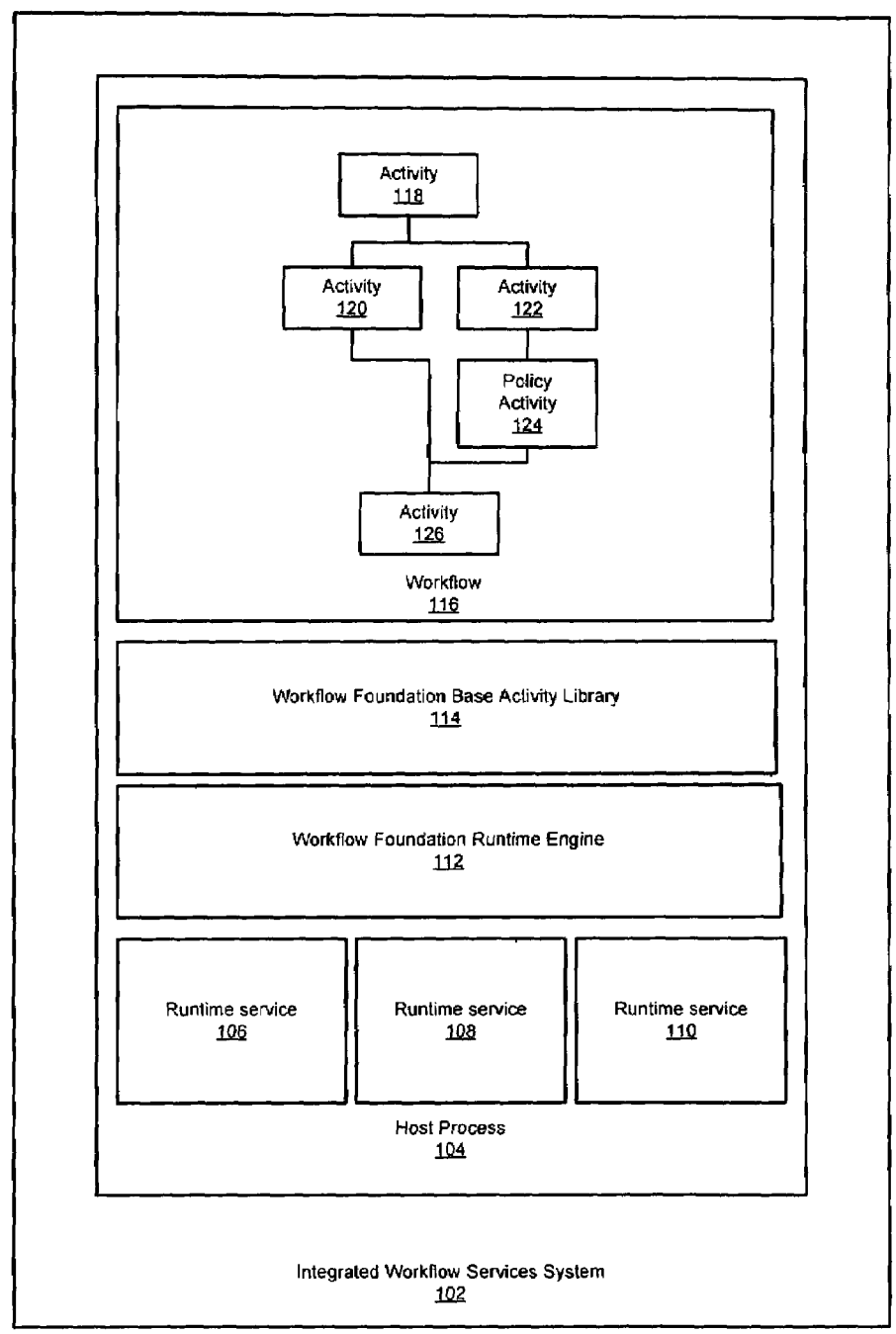
FIG. 1 illustrates an exemplary integrated workflow services system, upon which embodiments can be implemented.

Reference will now be made in detail to embodiments of the present claimed subject matter, examples of which are illustrated in the accompanying drawings. While the claimed subject matter will be described in conjunction with these embodiments, it will be understood that they are not intended to limit the claimed subject matter to these embodiments. On the contrary, the claimed subject matter is intended to cover alternatives, modifications and equivalents, which may be included within the spirit and scope of the claimed subject matter as defined by the appended claims. Furthermore, in the following detailed description of the present claimed subject matter, numerous specific details are set forth in order to provide a thorough understanding of the present claimed subject matter. However, it will be evident to one of ordinary skill in the art that the present claimed subject matter may be practiced without these specific details. In other instances, well known methods, procedures, components, and circuits have not been described in detail as not to unnecessarily obscure aspects of the claimed subject matter.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present claimed subject matter, discussions utilizing terms such as "setting," "storing," "scanning," "receiving," "sending," "disregarding," "entering," or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

Conventionally, rules engines and workflow products existed as separate technologies. Despite the fact that a rules engine and a workflow product both have the aim of improving the efficiency of business processes, rules engines and workflow products are customarily designed and marketed by different software vendors and suffered from a lack of integration.

In one example, a, software developer working on modeling a business process would have to use one application program for rule authoring and a different application program for workflow authoring. Similarly, the lack of integration can be felt during the execution aspect as well. For example, traditionally, rules (e.g., business rules) cannot be directly modeled against activities and/or fields of a workflow.

In contrast to traditional approaches, embodiments set forth various technologies for providing an integrated workflow services system. FIG. 1 illustrates an exemplary integrated workflow services system 102, upon which embodiments can be implemented. Integrated workflow services system 102 includes a host process 104, runtime service 106 (e.g., a workflow tracking service), runtime service 108 (e.g., a persistence service), runtime service 110, workflow foundation runtime engine 112 for executing workflows, workflow foundation base activity library 114, workflow 116, activity 118, activity 120, activity 122, policy activity 124, and activity 126. Also, although integrated workflow services system 102 is shown and described as having certain numbers and types of elements, embodiments are not so limited; that is integrated workflow services system 102 may include elements other than those shown, and may include more than one of the elements that are shown. Further, although interface 100 is illustrated under the present arrangement of elements, embodiments are not limited to the present arrangement of elements illustrated in FIG. 1. In one example, the policy activity 124 defines a ruleset having a number of rules.

Figure 2:
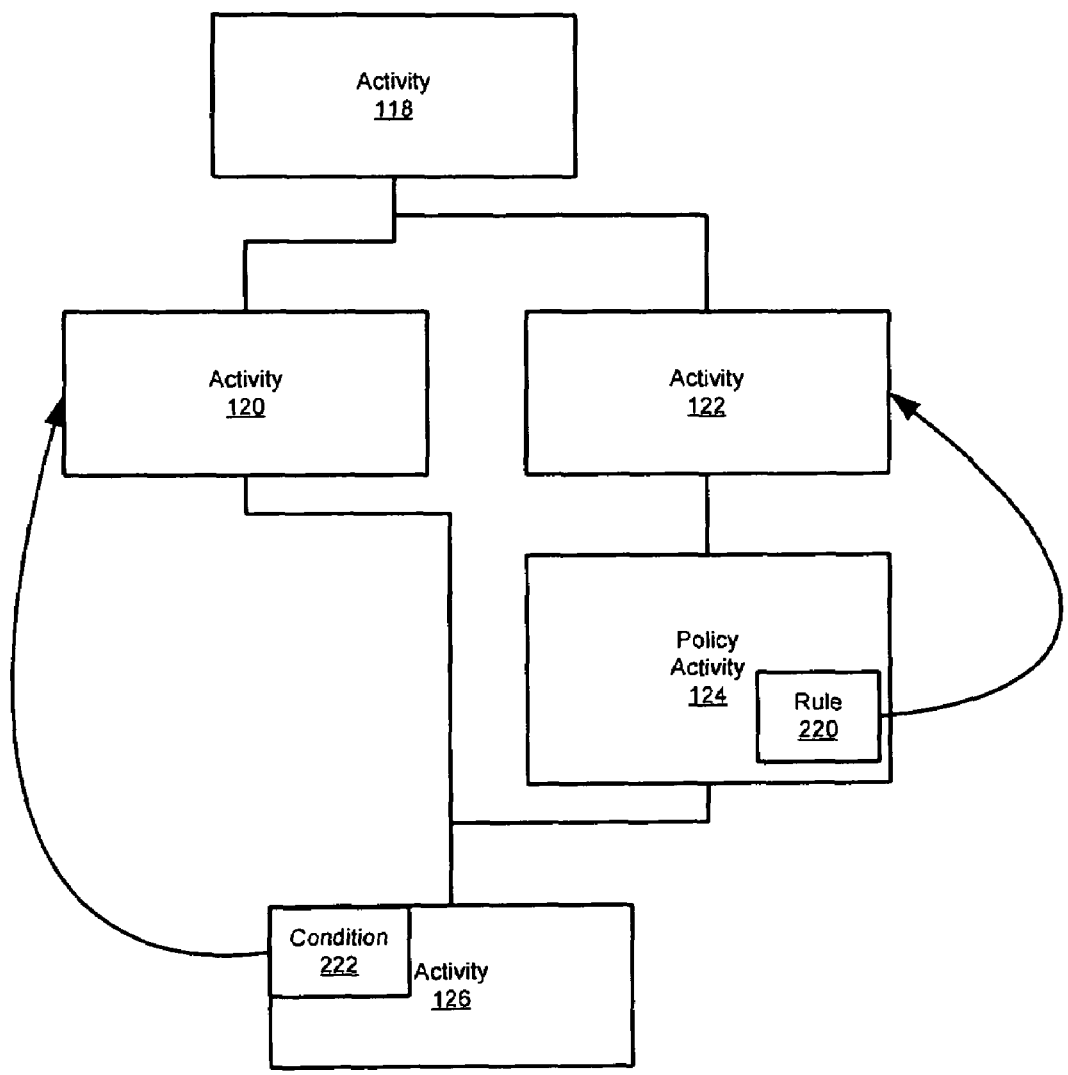
FIG. 2 illustrates block diagrams showing that a rule of a policy activity is expressed directly against an activity of a workflow, in accordance with an embodiment of the present claimed subject matter.

Also, at least one of the rules is defined directly against the workflow itself. The rule can be defined directly against a property, a method, an activity, or a field of the workflow. The integration between rules engines and workflow products allows rules to be expressed directly against the workflow model itself to provide developers a more connected experience. FIG. 2 provides an illustration of this capability. In one instance, a rule can refer specifically to a member on the workflow, an activity used in the workflow, and/or members on nested activities or objects. Specifically, FIG. 2 shows that rule 220 of policy activity 124 is expressed directly against activity 122. Also, FIG. 2 shows that a condition 222 of activity 126 points to activity 120. Further, it is important to note that conditions and rules could equally point to data on the workflow. Furthermore, one embodiment utilizes bindable properties in rules to allow activity properties to be bound to other activity properties, workflow parameters, and/or workflow fields. As a result, in one embodiment, it is not necessary to define a new schema, reference other assemblies, provide a mapping among models/types, define an interface, call a service (e.g., a web service), and/or send a message. Further, the policy activity 124 has access to a rules engine that is able to evaluate the ruleset. The rules engine provides forward chaining support such that the actions of one evaluated rule can cause other dependent rules to be reevaluated. Additionally, in one example, the workflow foundation runtime engine 112 serves as a communication gateway for communicating with application programs external of the integrated workflow services system 102. In this way, the integrated workflow services system 102 can more easily access and take advantage of different types of applications programs.

Moreover, in one embodiment, the rules designers use the same design-time type provider used by the workflow. Consequently, the rules can be authored against types defined in a project that have not yet been compiled. A workflow project is eventually compiled into a collection of .net classes and, usually, rules are authored against the same .net classes. In other words, the rules are generally pointed against the .net classes that one desires to author against. However, if the classes that a developer desires to author against do not exist yet because they are part of the workflow project that developer is currently authoring, then a difficulty arises as the developer is trying to author against classes that he or she has not yet created. In response to this challenge, a mechanism for simulating the existences of classes is utilized. In the present embodiment, the mechanism for simulating the existence of classes is the same for workflow authoring and rules authoring. As a result, the simulation mechanism can be used universally across workflow authoring and rules authoring, thus providing a highly useable integrated authoring experience for the developer. Also, the simulation mechanism supports designer rehosting. In particular, the simulation mechanism may be helpful to a developer that is writing an application that re-uses a portion of the design environment. Further, the design-time type provider can be used at runtime.

Furthermore, in one embodiment, the integration between the rules engine and workflow foundation runtime engine 112 allows a rule to execute an activity on a workflow. Specifically, as a result of the integration, rules become a native part of the workflow model and now have the ability to queue activities for execution. Here, the rules can do more than just access information from the workflow. In fact, the rules have access to the necessary runtime information such that it can schedule another activity to be executed in the workflow. In this way, the rule can directly drive the behavior of the workflow. Also, in one example, the same API and expression syntax in editors is used to drive rule execution in the context of a ruleset and to dictate the execution behavior of activities in the workflow.

Figure 3:
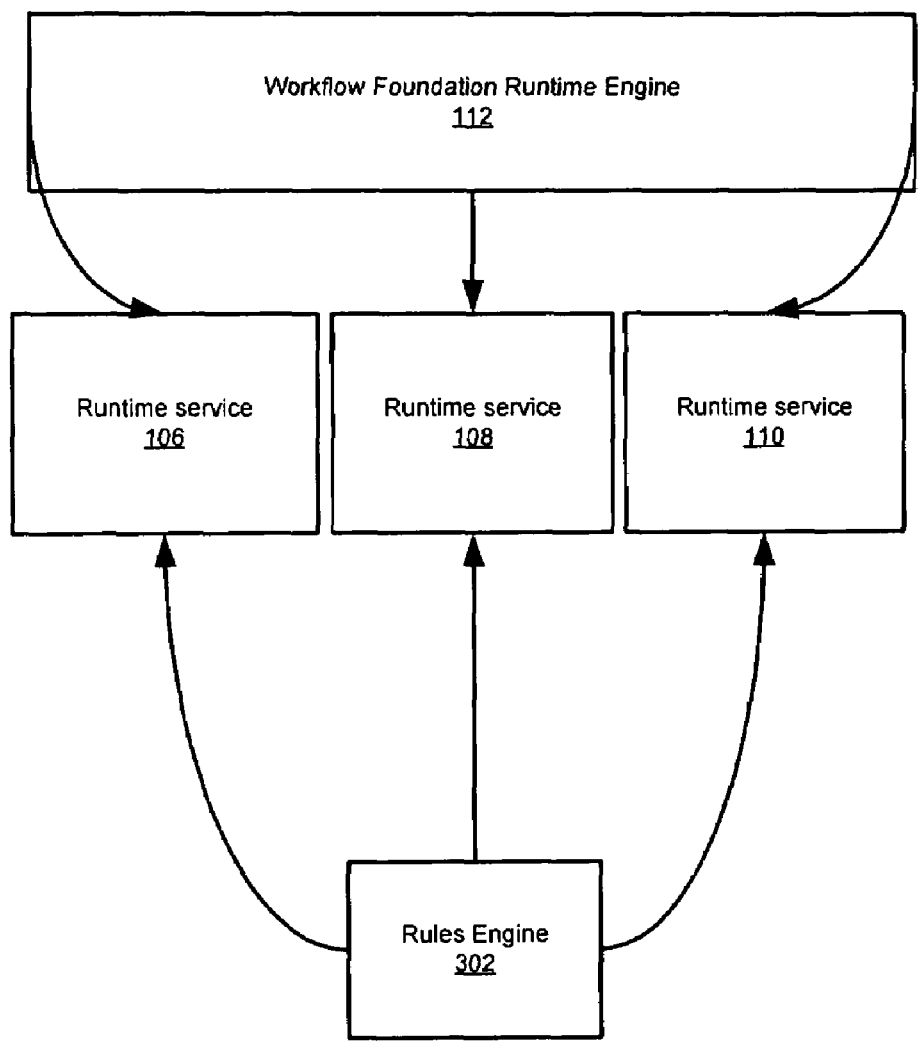
FIG. 3 illustrates block diagrams of a rules engine that has equal access as a workflow foundation runtime engine to runtime services, in accordance with an embodiment of the present claimed subject matter.

Conventionally, a workflow system did not provide a rules engine with the same degree of access to runtime services as it did with workflows. In particular, rules did not have access to various types of runtime services available on a host process. To overcome this deficiency, in one embodiment, runtime services, such as runtime services 106, 108, and 110, are made equally available to workflows as well as rules engines. FIG. 3 illustrates a rule engine 302 that has equal access as workflow foundation runtime engine 112 to runtime services 106, 108, and 110. In general, a workflow foundation runtime engine 112 needs to run within a windows process that is referred to as a workflow host, such as workflow host process 104. The workflow host process 104 provides the process for executing workflow foundation runtime engine 112. Also, in addition to hosting workflow foundation runtime engine 112, the host can have a collection of runtime services, such as a persistent service and/or a tracking service. Here, the integration allows both workflow activities as well as rules engines to have equal access to the workflow foundation runtime engine 112, and more specifically, to the runtime services that are configured to be part of the workflow host process 104. In one embodiment, the tracking service provides tracking for the execution of a workflow, such as when the workflow begins execution and when it ends and/or when each activity within the workflow is entered and exited. Further, in one embodiment, the tracking service provides tracking for the rules execution information. Also, in one example, the tracking information is written automatically into a database (e.g., a SQL Server database).

In one embodiment, the integrated workflow services system 102 includes an integrated debugging mechanism. As opposed to having separate debugging mechanisms for rules and workflow, the integrated debugging mechanism can analyze and detect errors for rules and workflow. The integrated debugging mechanism allows a user to perform an activity by activity evaluation of the workflow. Further, the integrated debugging mechanism is also capable of evaluating a policy activity as another activity within the workflow.

Moreover, in one embodiment, validation for workflow activities and rules are integrated. Typically, during real-time operation of a workflow certain forms of feedback information (e.g., visual cues) are provided to indicate whether the workflow is valid. For example, a visual cue may show that a property on an activity is not populated or that some required data on an activity is missing. Similarly, when the workflow is compiled, a full validation is performed. In one embodiment, in addition to workflow validation, the integrated workflow services system 102 also provides validation for rules and/or ruleset so that a user (e.g., a developer) can receive visual cues if problems exist in the rule definitions. For example, a visual cue indicating an error may show that a rule is defined to point at a property that no longer exists in the workflow. In this way, an embodiment of the integrated workflow services system 102 delivers an integrated validation mechanism.

Figure 4:
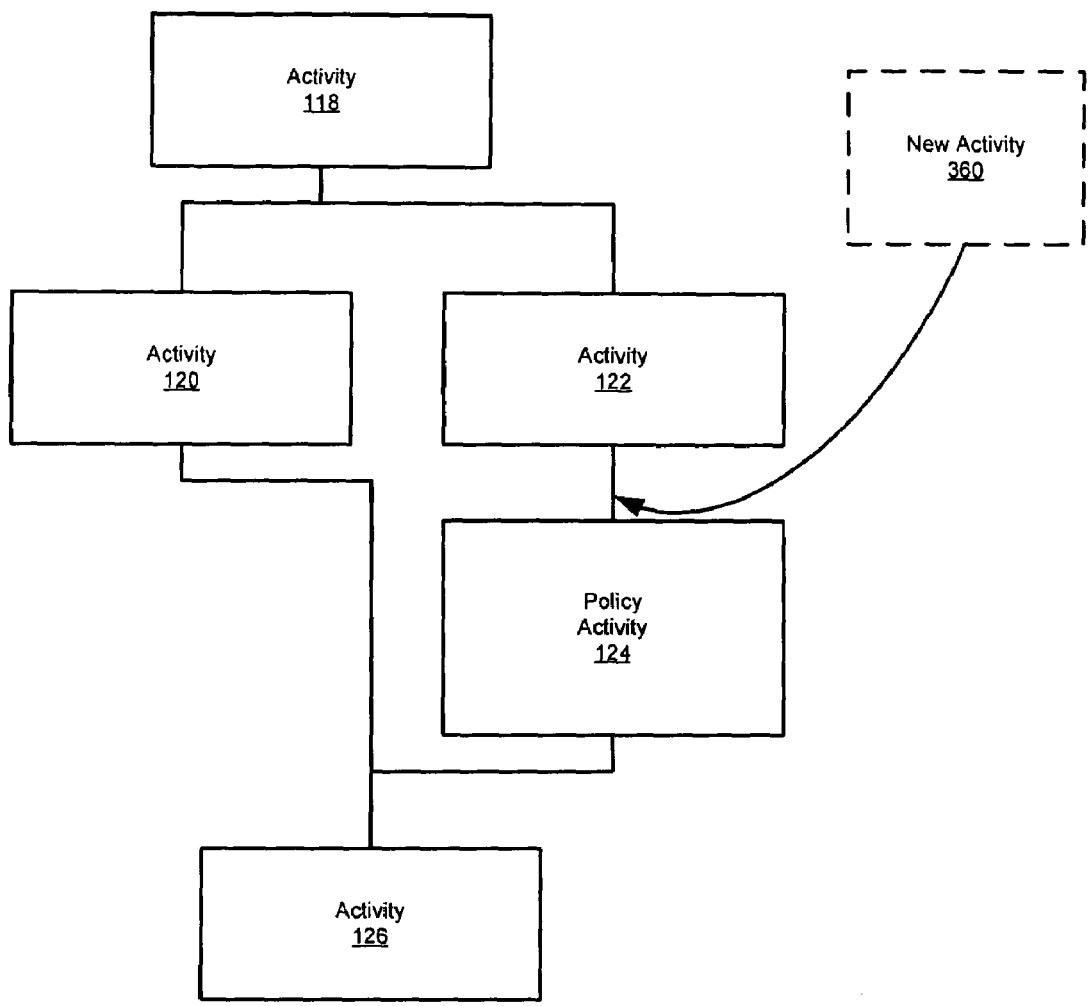
FIG. 4 illustrates block diagrams showing that a new activity can be inserted into a workflow on-the-fly, in accordance with an embodiment of the present claimed subject matter.

In addition, in one embodiment, the integrated workflow services system 102 includes a unified dynamic update mechanism for workflow activities and rules. The dynamic update mechanism allows a workflow activity to be inserted or removed on-the-fly while the workflow continues to execute. For example, FIG. 4 illustrates that a new activity 360 can be inserted on-the-fly. Also, the dynamic update mechanism allows a rule or a ruleset to be modified on-the-fly. It is important to note that, in one embodiment, the dynamic update can be performed without suspension, recompiling, and redeploying of the workflow. This is particularly advantageous as business processes are often volatile and undergoes frequent changes. The dynamic update mechanism allows changes and adjustments to be rapidly made without delay. Consequently, the dynamic update mechanism allows the integrated workflow services system 102 a way to efficiently mirror changes occurring in the business world.

Further, in one embodiment, the integrated workflow services system 102 allows rules and workflow activities to be both compiled as part of the workflow project. Although rules can be externalized from an assembly that includes the workflow, the rules can also be deployed as part of the assembly such that the workflow model is entirely self-contained. In other words, on one hand, the integrated workflow services system 102 allows deploying and managing rules and workflow as a single artifact. On the other hand, the integrated workflow services system 102 does not sacrifice flexibility as it still allows rules to be defined and executed outside the scope of a workflow. Moreover, editors used to author rules as part of a workflow can also participate in a rehosting mechanism that allows the workflow designers to be reused by a custom application.

Also, in one embodiment, the integrated workflow services system 102 uses a unified serialization/deserialization mechanism for rules and workflows. In other words, the same serialization/deserialization mechanism is used to serialize/deserialize rules to/from XML as the workflow model. Thus, the integrated workflow services system 102 enables independent software vendors and other custom solution providers to take a uniformed approach.

Figure 5:
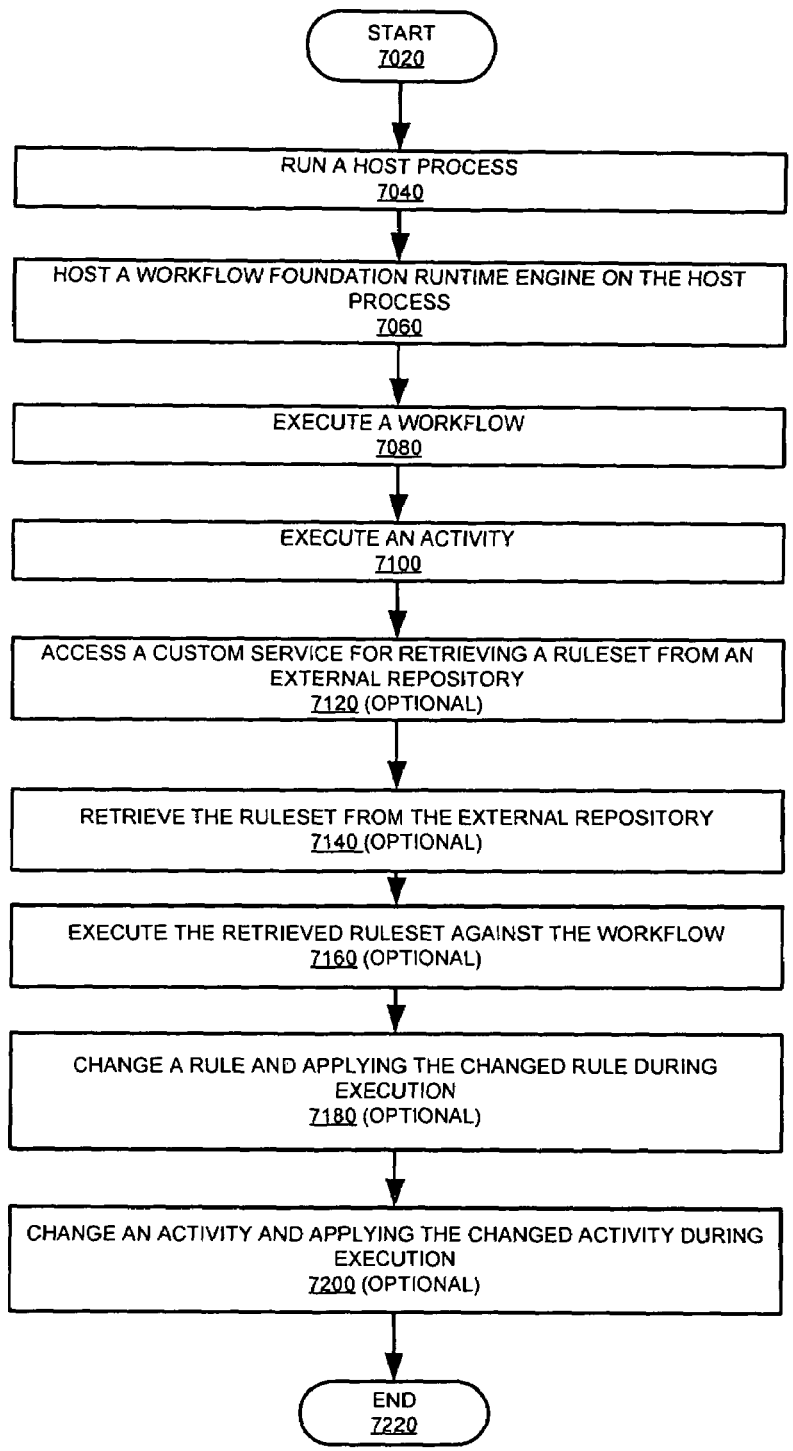
FIG. 5 illustrates a flowchart for providing an automated workflow services system upon which embodiments in accordance with the present claimed subject matter can be implemented.

FIG. 5 illustrates a flowchart 7000 for providing an automated workflow services system upon which embodiments in accordance with the present claimed subject matter can be implemented. Although specific steps are disclosed in flowchart 500, such steps are exemplary. That is, embodiments of the present claimed subject matter are well suited to performing various other or additional steps or variations of the steps recited in flowchart 500. It is appreciated that the steps in flowchart 500 can be performed in an order different than presented. At block 7020, the process starts.

At block 7040, a host process is running. At block 7060, a workflow foundation runtime engine is hosted by the host process. At block 7080, a workflow is executed. The workflow includes a number of activities. The activities include a policy activity. At block 7100, an activity is executed. The activity defines a ruleset having a number of rules. One of the rules is defined directly against the workflow itself. Also, the activity has access to a rules engine that is able to evaluate the ruleset. The activity can be a policy activity, a custom activity, or workflow code.

In one example, each rule of the policy activity has the form IF <condition> THEN <action> ELSE <action>. For example, the policy activity may include a ruleset having all the underwriting qualification for an insurance company. The rules engine determines which rules in the ruleset are true and executes the rules determined to be true. Also, if a rule is determined to be false, the rule would execute the Else actions. Additionally, it is important to note that a rule can be executed outside of the workflow. Moreover, a workflow can be executed using XML Readers without compilation.

At block 7120 (optional), a custom service for retrieving a ruleset from an external repository is accessed via an activity. At block 7140 (optional), the ruleset is retrieved from the external repository. At block 7160 (optional), the retrieved ruleset is executed against the workflow. At block 7180 (optional), a rule is changed and the changed rule is applied during execution of the workflow. This is accomplished without suspension, recompiling, and redeploying of the workflow. At block 7200 (optional), an activity is changed and the changed activity is applied during execution of the workflow. For example, a new activity can be inserted or an existing activity can be removed on-the-fly. Similarly, this is accomplished without suspension, recompiling, and redeploying of the workflow. At block 7220, the process ends.

Figure 6:
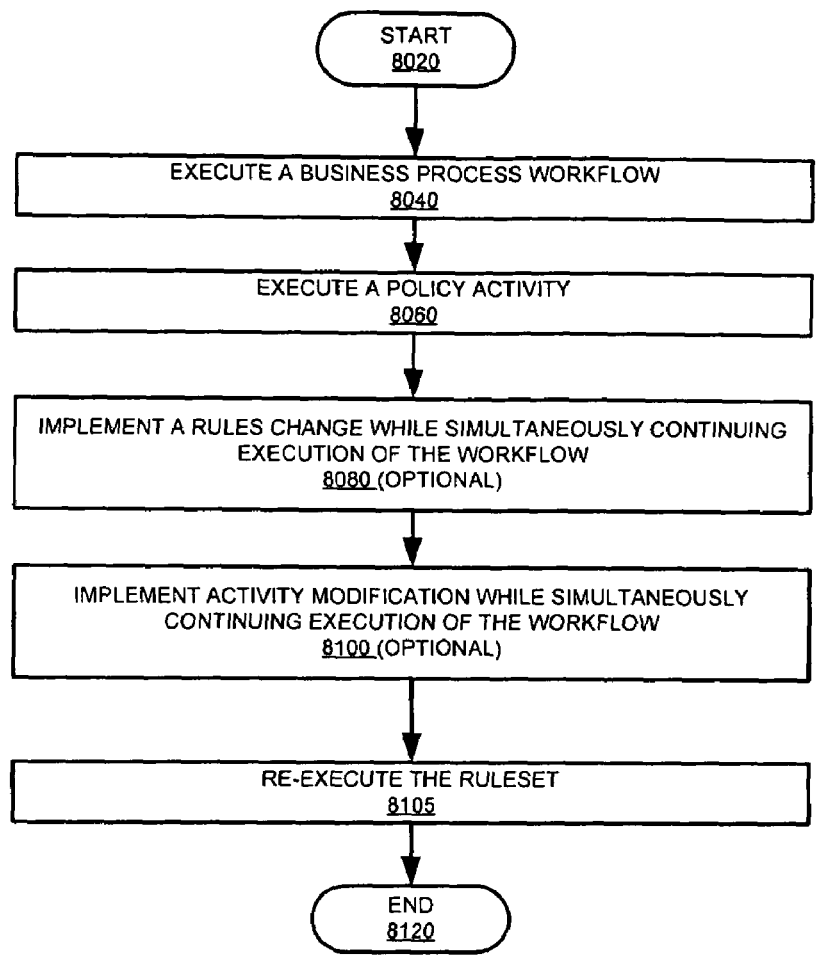
FIG. 6 illustrates a flowchart of business process automation upon which embodiments in accordance with the present claimed subject matter can be implemented.

FIG. 6 illustrates a flowchart 8000 of business process automation upon which embodiments in accordance with the present claimed subject matter can be implemented. At block 8020, the process starts. At block 8040, a business process workflow is executed in a computing device including a workflow processor and a rules engine. The business process workflow derives decision criteria from at least one rule. Also, the business process workflow includes a number of activities. One of the activities is a policy activity. At block 8060, the policy activity is executed. The policy activity defines a number of rules and at least one of the rules is defined directly against facts included in the workflow. Also, the policy activity has access to a rules engine that is able to evaluate the ruleset. At block 8080 (optional), rule changes are implemented while simultaneously continuing execution of the workflow. In one embodiment, the rule changes comprise declarative if/then statements. At block 8100 (optional), activity modification is implemented while simultaneously continuing execution of the workflow. In one embodiment, the activity modification comprises insertion of a new activity and/or removal of an activity of the number of activities. At block 8105, the ruleset is re-executed. At block 8120, the process ends.

Figure 7:
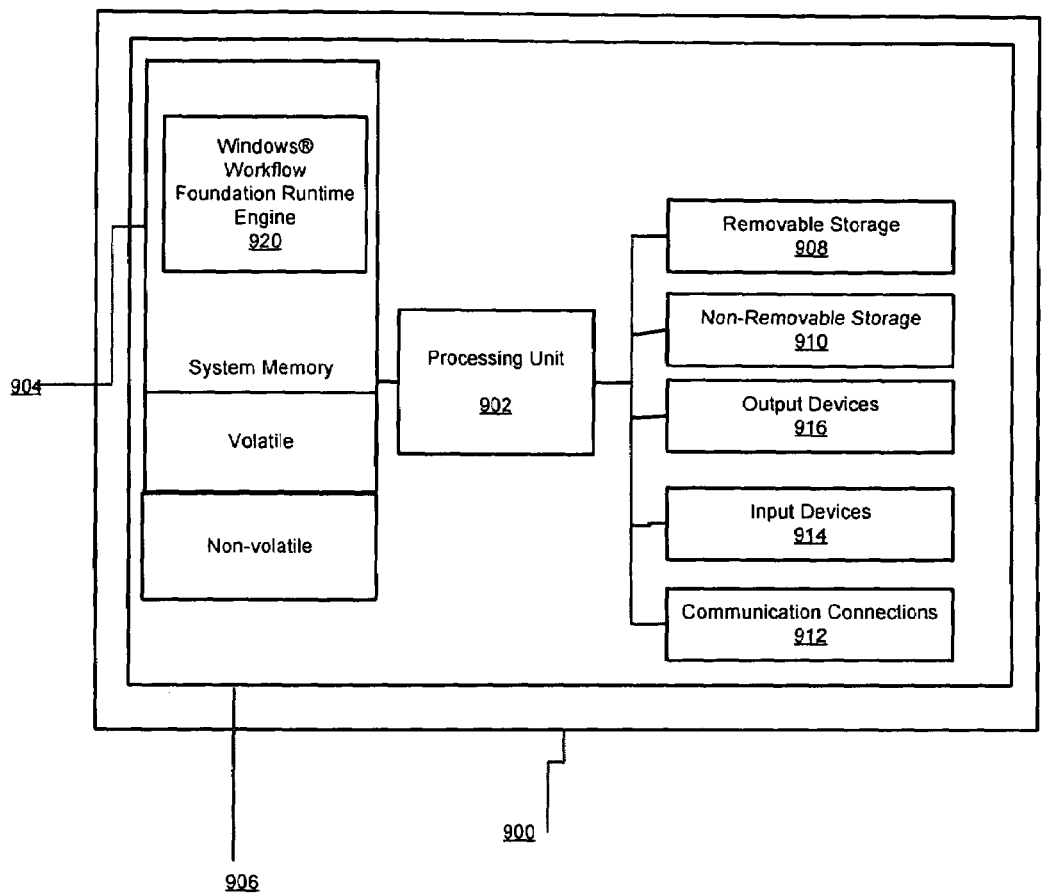
FIG. 7 illustrates an exemplary computing device, upon which embodiments can be implemented.

With reference to FIG. 7, an exemplary system for implementing the claimed subject matter includes a computing device, such as computing device 900. In its most basic configuration, computing device 900 typically includes at least one processing unit 902 and memory 904. Depending on the exact configuration and type of computing device, memory 904 may be volatile (such as RAM), non-volatile (such as ROM, flash memory, etc.) or some combination of the two. This most basic configuration is illustrated in FIG. 9 by dashed line 906. Additionally, device 900 may also have additional features/functionality. For example, device 900 may also include additional storage (removable and/or non-removable) including, but not limited to, magnetic or optical disks or tape. Such additional storage is illustrated in FIG. 9 by removable storage 908 and non-removable storage 910. Computer storage media includes volatile and nonvolatile, removable and non-removable media implemented in any method or technology for storage of information such as computer readable instructions, data structures, program modules or other data. Memory 904, removable storage 908 and non-removable storage 910 are all examples of computer storage media. Computer storage media includes, but is not limited to, RAM, ROM, EEPROM. flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 900. Any such computer storage media may be part of device 900.

Device 900 may be utilized to implement various application programs, such as Windows® Workflow Foundation Runtime Engine. In one embodiment, when executed, Windows® Workflow Foundation Runtime Engine executes a workflow that includes a policy activity. The policy activity defines a ruleset that includes a number of rules (e.g., business rules). At least one rule of the ruleset is defined directly against the workflow. Furthermore, the policy activity has access to a rules engine capable of evaluating rules in the ruleset. In this way, a high level of integration between a workflow services system and a rules engine is achieved, which allows rules to be directly modeled against different aspects (e.g., fields and/or activities) of a workflow.

Device 900 may also contain communications connection(s) 912 that allow the device to communicate with other devices. Communications connection(s) 912 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes storage media.

Device 900 may also have input device(s) 914 such as keyboard, mouse, pen, voice input device, touch input device, etc. Output device(s) 916 such as a display, speakers, printer, etc. may also be included. All these devices are well know in the art and need not be discussed at length here.

By providing an integrated workflow services system, embodiments deliver a seamless authoring and execution experience for developers. Furthermore, embodiments provide a level of integration between a workflow services system and a rules engine that allows rules to be directly modeled against different aspects (e.g., fields and/or activities) of a workflow. In this way, business processes can be more efficiently modeled.

In the foregoing specification, embodiments have been described with reference to numerous specific details that may vary from implementation to implementation. Thus, the sole and exclusive indicator of what is, and is intended by the applicants to be the claimed subject matter is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An integrated workflow services system having processor and memory comprising:
    a host process;
    a workflow foundation runtime engine for executing workflows, wherein said workflow foundation runtime engine is hosted by said host process and has access to at least one of a plurality of runtime services available on said host process, said plurality of runtime services, comprising:
        a first runtime service that provides support for persisting a state of said workflow; and
        a second runtime service that provides tracking of said workflow's execution;
    a rules engine integrated with said workflow foundation runtime engine, wherein said rules engine has access to at least one of said plurality of runtime services accessible by said workflow foundation runtime engine;
    a workflow foundation library;
    a workflow having a plurality of activities comprising:
    an activity defining a ruleset, wherein said ruleset comprises a plurality of rules, wherein at least one of said plurality of rules is defined directly against said workflow, and wherein said activity has access to said rules engine that is able to evaluate said ruleset and to schedule one or more other activities for execution in accordance with accessed runtime information.

2. The integrated workflow services system of claim 1, wherein a rule of said plurality of rules has access to runtime information of said workflow, and wherein said rule can be utilized to schedule an activity to be executed within said workflow.

3. The integrated workflow services system of claim 1, wherein at least one of said plurality of rules has direct access to a runtime service of said plurality of runtime services.

4. The integrated workflow services system of claim 1, wherein said workflow foundation runtime engine serves as a communication gateway for communicating with one or more application programs external of said integrated workflow services system.

5. The integrated workflow services system of claim 1, wherein said rules engine provides forward chaining support.

6. The integrated workflow services system of claim 1, wherein at least one of said plurality of rules is defined against a property of said workflow.

7. The integrated workflow services system of claim 1, wherein at least one of said plurality of rules is defined against an activity of said workflow.

8. The integrated workflow services system of claim 1, wherein at least one of said plurality of rules is defined against a field of said workflow.

9. The integrated workflow services system of claim 1, wherein an integrated mechanism exists for simulating the existence of classes for rules authoring and for workflow authoring.

10. The integrated workflow services system of claim 1, further comprising:
an integrated dynamic update component, wherein said integrated dynamic update component enables modification of a rule of said plurality of rules on-the-fly.

11. The integrated workflow services system of claim 1, further comprising:
an integrated serializer, wherein said integrated serializer enables serialization of said plurality of rules and said plurality of activities into XML documents, and wherein said integrated serializer enables deserialization of said plurality of rules and said plurality of activities from said XML documents.

12. A computer-implemented method for providing an automated workflow services system, the method comprising:
running a host process;
hosting a workflow foundation runtime engine on said host process, wherein said workflow foundation runtime engine has access to one or more runtime services available on said host process;
hosting a rules engine integrated with said workflow foundation runtime engine, wherein said rules engine has access to one or more runtime services accessible by said workflow foundation runtime engine;
executing a workflow, wherein said workflow comprises a plurality of activities; and
executing an activity of said plurality of activities, wherein said activity defines a ruleset, wherein said ruleset comprises a plurality of rules, wherein at least one of said plurality of rules is defined directly against said workflow, and wherein said activity has access to said rules engine that is able to evaluate said ruleset and to schedule one or more other activities for execution in accordance with accessed runtime information;
implementing rule changes while simultaneously continuing execution of said workflow, where said rule changes comprise declarative if/then statements; and
implementing activity modification while simultaneously continuing execution of said workflow, where said activity modification comprises insertion of a new activity and/or removal of an activity of said plurality of activities.

13. The method of claim 12, further comprising:
accessing a custom service for retrieving a ruleset from an external repository via an activity of said plurality of activities,
retrieving said ruleset from said external repository; and
executing said retrieved ruleset against said workflow.

14. The method of claim 12, further comprising:
changing a rule and applying said changed rule during execution of said workflow, wherein suspension, recompiling, and redeploying of said workflow is avoided; and
changing an activity and applying said changed activity during execution of said workflow, wherein suspension, recompiling, and redeploying of said workflow is avoided.

15. The method of claim 12, further comprising:
executing a plurality of runtime services on said host process, wherein a rule of said plurality of rules has access to a runtime service of said plurality of runtime services.

16. A computer-readable media having computer-readable instructions thereon which, when executed, implement a method comprising:
running a host process;
hosting a workflow foundation runtime engine on said host process, wherein said workflow foundation runtime engine has access to one or more runtime services available on said host process;
hosting a rules engine integrated with said workflow foundation runtime engine, wherein said rules engine has access to one or more runtime services accessible by said workflow foundation runtime engine and is able to execute one or more rule actions by evaluating one or more rule conditions;
executing a workflow, wherein said workflow comprises a plurality of activities; and
executing an activity of said plurality of activities, wherein said activity defines a ruleset, wherein said ruleset comprises a plurality of rules, wherein at least one of said plurality of rules comprises a rule condition and a rule action defined directly against a previously executed activity of said workflow, and wherein said activity has access to said rules engine that is able to evaluate rule conditions and execute rule actions of said ruleset, to reevaluate rule conditions of dependent rules of said ruleset based on executed rule actions of said ruleset, and to schedule one or more other activities for execution in accordance with accessed runtime information;
implementing rule changes while simultaneously continuing execution of said workflow, where said rule changes comprise declarative if/then statements; and
implementing activity modification while simultaneously continuing execution of said workflow, where said activity modification comprises insertion of a new activity and/or removal of an activity of said plurality of activities.

17. The computer-readable media of claim 16, further comprising:
executing a plurality of runtime services on said host process, wherein a rule of said plurality of rules has access to a runtime service of said plurality of runtime services.

* * * * *